United States Patent [19]
Stevenson

[11] 3,979,185
[45] Sept. 7, 1976

[54] CATALYTIC CONVERTER HAVING PLURAL REACTION STAGES WITH TEMPERATURE-COMPARING MEANS THEREIN

[75] Inventor: David John Stevenson, Arcadia, Calif.

[73] Assignee: The Lubrizol Corporation, Wickliffe, Ohio

[22] Filed: Jan. 21, 1974

[21] Appl. No.: 434,776

[52] U.S. Cl............................ 23/288 FB; 60/299
[51] Int. Cl.² ...................... B01J 8/04; F01N 3/15; F01N 7/00
[58] Field of Search......... 23/288 F, 288 FB, 288 K, 23/288 H; 60/299, 300

[56] References Cited
UNITED STATES PATENTS

| | | | |
|---|---|---|---|
| 1,877,523 | 9/1932 | Gordon | 23/288 F |
| 1,923,865 | 8/1933 | Handforth | 23/288 R X |
| 2,038,567 | 4/1936 | Ittner | 23/288 FB |
| 2,947,600 | 8/1960 | Clayton | 23/288 F |
| 3,061,416 | 10/1962 | Kazokas | 23/288 FB |
| 3,228,755 | 1/1966 | Lottwville | 23/288 FB |
| 3,248,872 | 5/1966 | Morrell | 23/288 F |
| 3,297,400 | 1/1967 | Eastwood | 23/288 FB |
| 3,537,823 | 11/1970 | Innes | 23/288 R X |
| 3,547,587 | 12/1970 | Innes | 23/288 F |
| 3,733,829 | 5/1973 | Henault | 23/288 F X |
| 3,740,197 | 6/1973 | Scheitlin et al. | 23/288 FB |
| 3,823,555 | 7/1974 | Cole | 23/288 FB |
| 3,832,443 | 8/1974 | Hass | 23/288 FB |

FOREIGN PATENTS OR APPLICATIONS

| | | | |
|---|---|---|---|
| 2,063,216 | 9/1971 | France | 23/288 FB |

Primary Examiner—Morris O. Wolk
Assistant Examiner—Bradley R. Garris
Attorney, Agent, or Firm—Donnelly, Maky, Renner & Otto

[57] ABSTRACT

A catalytic converter for controlling unburned emissions from automotive exhaust gases includes a reactor chamber having inlet and outlet openings for passage of the exhaust gases therethrough. Oxidizing catalyst devices are distributed along the reactor chamber between the inlet and outlet openings for contact by exhaust gases flowing therethrough. Secondary air feed means is provided for feeding secondary air into the reactor chamber at a plurality of spaced-apart locations between the inlet and outlet openings. The secondary air feed means includes a conduit extending in a tortuous path through the reactor chamber for pre-heating secondary air flowing through the conduit prior to discharge into the reactor chamber. The flow rate and distribution of secondary air are arranged to prevent overheating of the catalyst. Malfunction of the converter is detected by comparing temperatures in the last two stages or by sensing the absolute temperature of the last stage.

12 Claims, 2 Drawing Figures

CATALYTIC CONVERTER HAVING PLURAL REACTION STAGES WITH TEMPERATURE-COMPARING MEANS THEREIN

BACKGROUND OF THE INVENTION

This application relates to a catalytic converter, and more particularly to such a converter for controlling or purifying unburned emissions from exhaust gases. The invention is particularly applicable for use in controlling unburned emissions from exhaust gases of fuel burning engines and will be particularly described with reference thereto. However, it will be appreciated that the invention has broader aspects and may be used for controlling unburned emissions from other sources.

Exhaust gases from such fuel burning engines usually include unburned emissions in the form of hydrocarbons and carbon monoxide, and catalytic converters employing an oxidizing catalyst have been proposed for oxidizing such emissions.

It is thus known that oxidation of such emissions in the converter produces considerable heat, and the oxidizing catalyst will melt or otherwise become ineffective if it is heated to an extremely high or excessive temperature.

If an engine is continuously properly tuned, it would be possible to accurately predict the average unburned emissions in the exhaust gases and a catalytic converter could therefore be designed without serious overheating problems. However, engines are or become often out of tune due to fouled plugs or incorrect spark gap setting, carburetor foulding or improper adjustment, ignition fouling or improper adjustment, and other well-known causes. When the engine is in fact out of tune, the amount of unburned emissions in the exhaust gases are significantly increased. Oxidation of significantly greater amounts of unburned emissions than calculated in the converter causes overheating and destruction of the catalytic converter, rendering it inoperative.

Secondary air is thus commonly fed to the converter for providing excess free oxygen in the exhaust gases for reaction with the unburned emissions, with such secondary air usually preheated by feeding it into the exhaust manifold or exhaust pipe ahead of the converter. Feeding cool secondary air directly into the converter is not a satisfactory solution since the efficiency of the converter requires high temperature operation. Secondary air is commonly fed into the exhaust gases by venturi action or by an air pump driven by the engine.

When all secondary air is fed to the system upstream of the converter, a significant increase in the amount of unburned emissions can result in greater oxidation at the leading portion of the catalyst than was intended, and at least the initial or entry portion of the catalyst destroyed. One way of minimizing this problem is suggested by U.S. Pat. Nos. 3,180,712 to Hamblin and 3,186,806 to Stiles. According to these disclosures, the secondary air is delivered in stages along the length of the catalyst bed. When excessive amounts of unburned emissions are present, only a limited amount would be oxidized in each stage of the converter so the leading portion of the catalyst does not overheat. However, these prior arrangements do not provide an efficient and inexpensive manner of pre-heating the secondary air or uniformly distributing it at each stage.

Catalytic converters of the type described have also included temperature sensing arrangements for automatically bypassing exhaust gases around the converter when the converter overheats. Such arrangements are relatively ineffective because the converter is thereby inoperative and could remain so if the operator of the engine did not correct the problem responsible for the excess of the unburned emissions.

SUMMARY OF THE INVENTION

A multi-stage catalytic converter of the type described includes a reactor chamber having inlet and outlet openings for passage of exhaust gases therethrough. An oxidizing catalyst is distributed in sections in the stages of the chamber between such openings, and secondary air is fed to the chamber at plural spaced-apart locations. The secondary air is fed to areas within the reactor chamber by means of a conduit which extends in a tortuous path through the reactor itself. This secondary air conduit is therefore heated to a very high temperature by the hot reactor chamber, whereby the air flowing through the same is heated to a high temperature prior to discharge into the chamber.

In accordance with another aspect of the invention, the secondary air conduit includes distributing means for distributing the secondary air transversely of the reactor chamber, so that the secondary air is substantially uniformly distributed throughout the exhaust gases prior to passage thereof through the oxidizing catalyst. In one arrangement, the secondary air conduit has a series of outlet openings spaced-apart transversely of the chamber at each stage therein to define the distributing means.

In accordance with another aspect of the invention, the oxidizing catalyst includes a plurality of catalyst beds spaced-apart longitudinally between the inlet and outlet openings of an axial flow reactor chamber to provide a plurality of successive reactor stages. Temperature comparing means is provided for comparing temperatures in at least two of such stages and energizing a signal when the temperature differential reaches a predetermined value. In the preferred arrangement, the temperature of the final downstream reactor stage is compared with the temperature of at least one of the upstream stages. When excessive unburned emissions are present in the exhaust gases, the temperature of the reactor chamber will increase from the inlet toward the outlet opening, since oxidation and release of heat is continuously taking place along the chamber to increase the temperature of the exhaust gases. Therefore, the final downstream reactor stage should reach a higher temperature than the other stages when excessive unburned emissions are present. Comparing the temperature of the final downstream stage with the next adjacent upstream stage, for example, makes it possible to energize a warning light or audible signal when a predetermined temperature differential is reached, so that the operator of the engine is alerted to the malfunction and can have the causative problem corrected.

DESCRIPTION OF A PREFERRED EMBODIMENT

Figure 1:
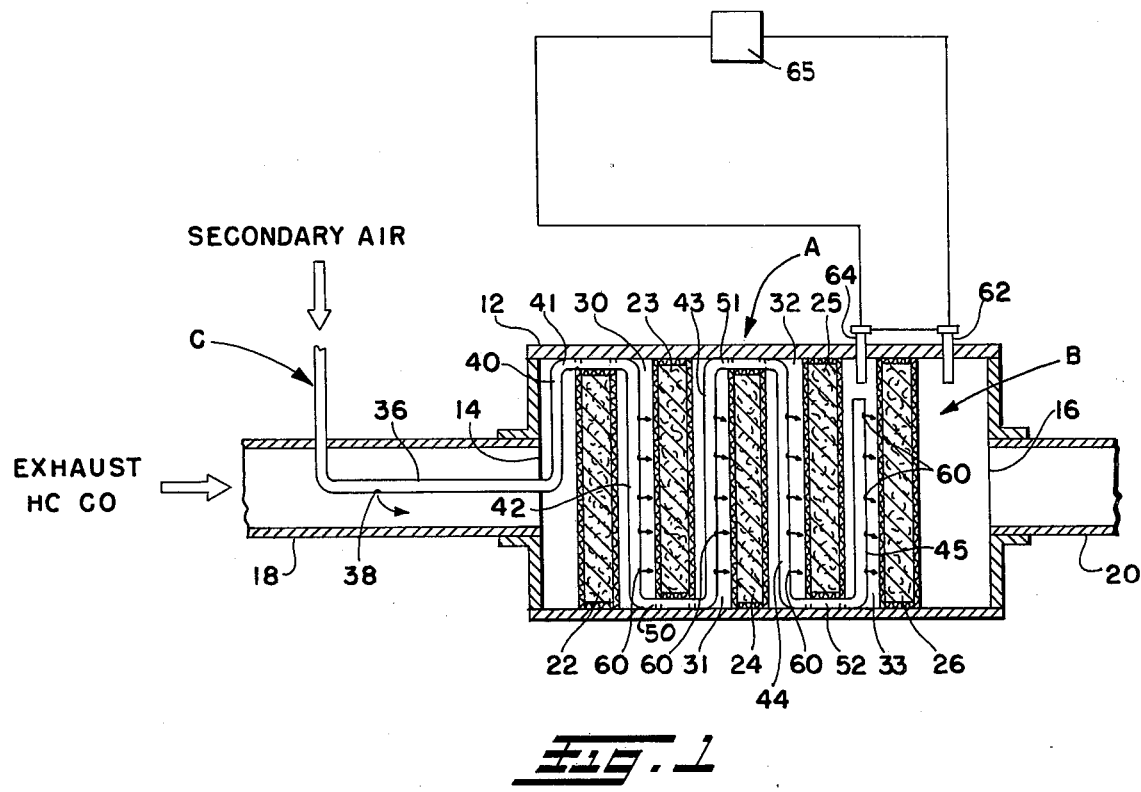
FIG. 1 is a schematic longitudinal cross-sectional view of a catalytic converter constructed in accordance with the present invention.

Referring now to the drawings, wherein the showings are for purposes of illustrating a preferred embodiment of the invention only and not for purposes of limiting the same, catalytic converter A comprises an elongated generally cylindrical housing 12 having an internal reactor chamber B, and inlet and outlet openings 14 and 16 at the respective ends for passage of exhaust gases through the chamber B. It will be recognized that the reactor chamber may take many different shapes and be constructed of many different materials. Stainless steel or the like is often used for such chambers.

Converter A is adapted for connection to an exhaust pipe 18 from a fuel burning engine, and a tailpipe 20 is connected with outlet opening 16.

Oxidizing catalyst means is distributed in reactor chamber B between inlet and outlet openings 14 and 16, in the form of a plurality of catalyst beds 22–26 spaced-apart between such openings. Each catalyst bed 22–26 may comprise a generally circular metal mesh basket of stainless steel or the like packed with a known suitable oxidizing catalyst. Each bed 22–26 extends completely across the interior of reactor chamber B, so that exhaust gases must flow successively through each bed. Adjacent beds are separated by spaces 30–33 which have a width at least as great as the width of each bed to provide the desired plural reactor stages, with each bed 22–26 and the space downstream therefrom considered as a separate reactor stage. The oxidizing catalyst may be of any known suitable type, such as refractory pellets coated with platinum.

Secondary air feed means for feeding secondary air to reactor chamber B at spaced-apart locations between inlet 14 and outlet 16 includes conduit C. This conduit C extends into and for a distance within exhaust pipe 18 toward the converter, as shown at 36. Conduit C is thus heated by the engine exhaust gases so that secondary air flowing therethrough is pre-heated prior to discharge thereof through outlet opening 38 for thorough mixture with the exhaust gases prior to reaching first catalyst bed 22. Within the leading end of the reactor chamber, the conduit extends radially or laterally to the outer edge of bed 22 and then through the latter, as shown at 40 and 41. The conduit is then reversely bent or connected in a series of reverse bends so that it has transverse sections 42–45 extending substantially completely across reactor chamber B respectively within the spaces 30–33. Such transverse conduit sections 42–45 are interconnected by straight conduit portions 50–52 through the several beds, preferably in sealed relation so that substantially all of the exhaust gases must pass through the beds. Each transverse conduit section 42–45 is provided with a series of outlet openings 60 spaced transversely of chamber B to provide for discharge of the secondary air within each of the spaces 30–33. This defines a distribution means and insures a thorough dispersion of the secondary air in the exhaust gases as the latter pass through each catalyst bed 22–26.

It will be apparent that other arrangements may be provided for such extension of the conduit C in the desired tortuous path through reactor chamber B. Conduit C may, for example, extend straight through the center of each catalyst bed 22–26, with transverse sections 42–45 curved into somewhat of a circular or coil shape. With the arrangement described, all of conduit C is heated to a very high temperature due to its positioning within reactor chamber B. Therefore, all secondary air therein and entering reactor chamber B is pre-heated of optimum operating efficiency of the catalytic converter.

Figure 2:
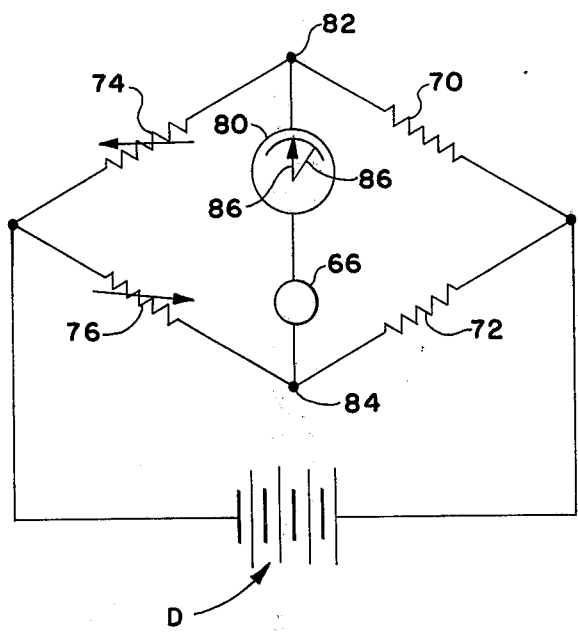
FIG. 2 is a circuit diagram of a temperature sensing or monitoring circuit useable therewith.

In accordance with another aspect of the invention, temperature comparing means is provided for comparing temperatures in at least two stages of reactor chamber B. In the arrangement shown, a first probe 62 is positioned in the final downstream reactor stage adjacent bed 26 and another probe 64 is positioned in the next upstream reactor chamber. The remaining portion of the temperature comparing means is shown schematically at 65 in FIG. 1, the details of which will be described hereafter with reference to FIG. 2.

The probes 62 and 64 may be of the type containing resistances having a positive or negative temperature coefficient. Such resistances are shown at 70 and 72 in FIG. 2 as part of a bridge circuit including further bridge resistances 74 and 76 which are adjusted so that the bridge circuit is balanced when resistance probes 70 and 72 are at ambient temperature. The bridge circuit is connected to battery D or the electrical system of a vehicle in which the system is installed. A deflection pyrometer 80 is connected across points 82 and 84, and includes a set pointer 86 which is set to a voltage proportional to a desired temperature differential. One of the resistance probes 62 or 64 is located in the final downstream reactor stage, while the other resistance probe is located in an upstream stage. When excessive amounts of unburned emissions pass through the converter, the final downstream reactor stage will overheat. When the temperature in the two chambers varies, the resistance of resistances 70 and 72 will be different, therefore, and needle or arm 86 will then deflect an amount proportional to the voltage difference across points 82 and 84. When the voltage difference is proportional to a predetermined temperature differences, for example, 200°F., a relay within deflection pyrometer 80 itself will close to energize a warning device 66 which may be an indicator light or an audible device and can be mounted on the dashboard of a vehicle, for example, to indicate to the driver that the system requires attention. With the arrangement described, this is one way of comparing the temperatures in two reactor stages and energizing the signal when a predetermined temperature difference of around 200°F. exists between the two stages. Obviously, many other temperature comparing arrangements may be utilized. It will be recognized that it is also possible to simply measure the actual temperature of reactor chamber B at any stage to energize a warning device.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A catalytic converter for purifying exhaust gases, comprising: a reactor chamber having longitudinally spaced inlet and outlet openings for passage of exhaust gases therethrough, oxidizing catalyst means longitudinally distributed along said chamber between said inlet and outlet openings, means for causing exhaust gases to flow in a longitudinal direction successively through said longitudinally distributed oxidizing catalyst means for contact with said oxidizing catalyst means, secondary air feed means for feeding secondary air into said chamber at a plurality of longitudinally spaced-apart locations between said inlet and outlet openings, said secondary air feed means extending longitudinally through said chamber for a substantial portion of the length thereof between said inlet and outlet openings in direct exposure to the exhaust gases passing through said chamber for pre-heating said secondary air flowing therethrough prior to discharge of said secondary air from said secondary air feed means into said chamber, said secondary air feed means having a plurality of outlet means at longitudinally spaced-apart locations between said inlet and outlet openings for distributing a portion of said secondary air flowing through said secondary air feed means at each of said longitudinally spaced-apart locations, said oxidizing catalyst means including a plurality of catalyst beds longitudinally spaced apart in said chamber between said inlet and outlet openings therein to define a plurality of longitudinally spaced reactor stages each comprising one of said beds and the space longitudinally downstream of each said bed, and temperature comparing means for comparing the temperature of at least two of said stages so as to obtain the temperature differential between said stages.

2. The converter of claim 1 further including signal means connected with said temperature comparing means for energization by said temperature comparing means upon attainment of a predetermined temperature difference between said two stages.

3. The converter of claim 2 wherein said temperature comparing means comprises a bridge circuit including a first resistance element exposed to the temperature at one of said two stages and a second resistance element exposed to the temperature at the other of said two stages, and means for comparing the resistances of said first and second resistance elements which resistances vary directly with temperature, whereby the temperature differential between said stages is obtained, and means for energizing said signal means upon attainment of such predetermined temperature difference between said two stages.

4. The converter of claim 2 wherein said plurality of reactor stages include a final downstream stage and a plurality of upstream stages, said temperature comparing means being arranged and constructed for comparing the temperature of said final downstream stage with the temperature of at least one of said upstream stages.

5. A catalytic converter for purifying exhaust gases, comprising: a reactor chamber having longitudinally spaced inlet and outlet openings for passage of exhaust gases therethrough, a plurality of oxidizing catalyst beds in said chamber longitudinally spaced-apart between said inlet and outlet openings to define a plurality of longitudinally spaced reactor stages each comprising one of said beds and the space longitudinally downstream of each said bed, and temperature comparing means for comparing the temperature of at least two of said stages so as to obtain the temperature differential between said stages.

6. The converter of claim 5 wherein said plurality of reactor stages include a final downstream stage and a plurality of upstream stages, said temperature comparing means being arranged and constructed for comparing the temperature of said final downstream stage with the temperature of at least one of said upstream stages.

7. The converter of claim 5 further including signal means connected with said temperature comparing means for energization by said temperature comparing means upon attainment of a predetermined temperature difference between said two stages.

8. The converter of claim 7 wherein said temperature comparing means comprises a bridge circuit including a first resistance element exposed to the temperature at one of said two stages and a second resistance element exposed to the temperature at the other of said two stages, and means for comparing the resistances of said first and second resistance elements which resistances vary directly with temperature, whereby the temperature differential between said stages is obtained and means for energizing said signal means upon attainment of such predetermined temperature difference between said two stages.

9. The converter of claim 5 further comprising means for causing exhaust gases to flow in a longitudinal direction successively through said longitudinally spaced reactor stages, secondary air feed means for feeding secondary air into said chamber at a plurality of longitudinally spaced-apart locations between said inlet and outlet openings, said secondary air feed means extending longitudinally through said chamber for a substantial portion of the length thereof between said inlet and outlet openings in direct exposure to the exhaust gases passing through said chamber for pre-heating said secondary air flowing therethrough prior to discharge of said secondary air from said secondary air feed means into said chamber, said secondary air feed means having a plurality of outlet means at longitudinally spaced-apart locations between said inlet and outlet openings for distributing a portion of said secondary air flowing through said secondary air feed means at each of said longitudinally spaced-apart locations, said plurality of outlet means including plural spaced-apart transverse sections extending substantially completely across said chamber transversely between successive portions of said longitudinally spaced reactor stages, each of said transverse sections having a series of discharge openings therein spaced transversely of said chamber for introducing said secondary air into said chamber in a dispersed manner.

10. The converter of claim 9 wherein said beds completely span said chamber transversely thereof, and wherein said plurality of outlet means for said secondary air are located in the longitudinal spaces in said chamber between said plurality of longitudinally spaced beds.

11. The converter of claim 10 wherein said secondary air feed means comprises a single conduit means extending in a tortuous path generally longitudinally along said plurality of beds and generally transversely of said chamber in the longitudinal spaces between said plurality of beds to provide generally transverse conduit sections having a series of outlet openings therein and wherein said outlet means for said secondary air includes said transverse conduit sections.

12. The converter of claim 11 further comprising an exhaust pipe connected to said inlet opening, said single conduit means extending through said exhaust pipe for at least a portion of the length of said exhaust pipe into said inlet opening and through said reactor chamber, and additional outlet means in the portion of said single conduit means extending through said exhaust pipe for discharge and mixing of a portion of the secondary air with the exhaust gases prior to entering said reactor chamber.

* * * * *